(12) United States Patent
Reich et al.

(10) Patent No.: US 6,641,634 B2
(45) Date of Patent: Nov. 4, 2003

(54) HAND-HELD TOOL WITH DUST EXTRACTION

(75) Inventors: Doris Reich, Stuttgart (DE); Steffen Wuensch, Holzgerlingen (DE); Andreas Hoffman, Winnenden (DE); Ulrich Mueller-Boysen, Esslingen (DE); Franz Scheschark, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,411
(22) PCT Filed: Jan. 31, 2001
(86) PCT No.: PCT/DE01/00361
§ 371 (c)(1), (2), (4) Date: Jan. 31, 2002
(87) PCT Pub. No.: WO01/58642
PCT Pub. Date: Aug. 16, 2001

(65) Prior Publication Data
US 2002/0152731 A1 Oct. 24, 2002

(30) Foreign Application Priority Data
Feb. 10, 2000 (DE) .......................................... 100 05 976

(51) Int. Cl.[7] .............................................. B23Q 11/00
(52) U.S. Cl. ...................... 55/385.1; 55/500; 55/502; 55/DIG. 3; 173/75; 173/207; 175/75; 175/209; 408/67
(58) Field of Search ............................. 55/385.1, 500, 55/502, DIG. 3; 173/75, 207; 175/75, 209; 408/67

(56) References Cited

U.S. PATENT DOCUMENTS

| 3,741,317 | A | * | 6/1973 | Unterschweiger et al. .. 173/109 |
|---|---|---|---|---|
| 4,192,390 | A | | 3/1980 | Reibetanz |
| 5,467,835 | A | | 11/1995 | Mueller-Boysen |
| 5,738,177 | A | * | 4/1998 | Schell et al. ................. 173/178 |
| 5,909,016 | A | * | 6/1999 | Sterling .................... 173/254.2 |
| 6,286,609 | B1 | * | 9/2001 | Carrier et al. ............... 173/217 |

FOREIGN PATENT DOCUMENTS

| EP | 0 434 295 A | 6/1991 |
|---|---|---|
| EP | 0 548 782 A | 6/1993 |
| EP | 0 558 253 A | 9/1993 |

* cited by examiner

Primary Examiner—Duane Smith
Assistant Examiner—Minh-Chan T. Pham
(74) Attorney, Agent, or Firm—Michael J. Striker (57) ABSTRACT

A manual machine tool (10) includes a vacuum device for dust removal (19) situated in its housing (12) and a blow-out connection (20) installed after this. A dust collection box (21), particulaily self-contained, can be attached in detachable fashion to the blow-out connection (20) via its blow-in connection (22). The dust collection box (21) is airtight on all but two sides and has air-exit holes (40) on the top side (36) and a dustproof filter element (48)—especially a fluted filter—on the inside. The dust collection box is particularly secure against the unintentional escape of dust after the dust collection box is detached from the associated manual machine tool because a pair of sealing lips (500) arranged as a separate part is provided inside the blow-in connection (22), which pair of sealing lips (500) is connected as a single part with closing flaps (520, 520) projecting into the interior of the dust collection box (210).

1 Claim, 9 Drawing Sheets

HAND-HELD TOOL WITH DUST EXTRACTION

BACKGROUND OF THE INVENTION

The invention is based on a manual machine tool with a vacuum device for dust removal.

A hammer drill is made known in U.S. Pat. No. 4,192,390 that includes its own vacuum device for dust removal, with which the boring dust produced can be suctioned—according to the vacuum cleaner principle using suction air—into a dust collection box mounted on the hammer drill in relatively complicated fashion, with the suction air passing through a lamellar dust filter onto which the boring dust is deposited and collects in the dust collection box. The dust collection box is intended to remain attached to the hammer drill and has a base that can be swung open to empty the boring dust.

Another hammer drill is made known in U.S. Pat. No. 5,467,835 that comprises a vacuum device for dust removal with which boring dust that is produced can be suctioned— also according to the vacuum cleaner principle using suction air—into a separate dust collection box installed in a housing in removeable fashion. A fluted filter is situated in front of the suction port of the dust collection box facing the suction fan, onto which the dust is deposited when suction air passes through and collects in the dust collection box, so that pure air is transported toward the suction fan. The dust collection box can be detached from the housing to empty the boring dust, and the boring dust can be emptied through the entrance port.

The dust collection boxes of the two known hammer drills can be emptied only by way of a relatively complicated procedure, whereby replacement of the lamellar or fluted filter is a complicated procedure. Moreover, these dust collection boxes are unsuited for self-contained attachment to manual machine tools with integrated vacuum devices for blowing in the dust.

Manual machine tools are also known that are provided with plastic cassettes serving as dust collection boxes that are either provided with a multitude of air vents and are lined with filter material—similar to a grass catcher used with lawn mowers—or that consist of porous, only slightly dimensionally stable, air-permeable plastic that cleans the air blowing in the dust released from the container and is intended to retain the dust inside it. Both plastic cassettes tend to become plugged, and they are difficult to empty and clean.

In the known dust collection box, a specially-formed sealing lip made of the same material as the housing is produced during injection-molding. This can be achieved only if relatively soft material such as polypropylene (PP) is used as the housing material. When materials such as PA6 (polyamide, quality class 6) or light-metal die casting, for example, are used to make the housing for dust collection boxes, separate rubber-elastic seals must be installed instead.

In the known dust collection box, a specially-formed sealing lip made of the same material as the housing is produced during injection-molding. This can be achieved only if relatively soft material such as PP is used as the housing material. When materials such as PA6 or light-metal die casting, for example, are used to make the housing for dust collection boxes, separate rubber-elastic seals must be installed instead.

SUMMARY OF THE INVENTION

The manual machine tool according to the invention with vacuum device for dust removal has the advantage, in contrast, that a particularly lightweight and compact dust collection box was created than can accommodate a large volume of blown-in dust without losing its inherent stability, whereby the removal by suction of the grinding dust from the tool takes place with a consistently high level of effectiveness and a long usable filter life with improved fine-dust filtration practically until the maximum fill level is reached.

Due to the fact that the dust collection box is held tightly against the manual machine tool—except at the dust blow-out connection of the manual machine tool—by way of a projection on its top cover, the forces of deformation produced when the dust collection box becomes full of dust are reduced to the extent that the cross-sections of the walls of the dust collection box can be minimal and, as a result, the dust collection box is particularly lightweight but stable, i.e., not Due to the fact that the dust collection box, as a case open on the top, is provided with a removeable cover that closes the opening from above, only a minimal loss of pressure occurs during dust removal, whereby the dust can be disposed of particularly conveniently by opening the cover, without creating a dust cloud and polluting the environment.

Due to the fact that only the cover carries a filter, in particular a fluted filter, and it is the only part of the dust collection box provided with air vents, the filter surface can be designed to be particularly large in size. As a result, the air carrying the dust becomes blocked only to a minimal extent, and the vacuum device for dust removal is highly effective. Additionally, the dust can come loose from the fluted filter automatically when it reaches a certain layer thickness and fall into the dust collection box under the influence of gravity.

Due to the fact that the surface of the dust collection box with the cover is tilted in comparison with the direction of flow of the blow-out air in such a fashion that the dust collection box tapers toward the machine in the shape of a wedge, dust-preventing flow conditions are created for the blow-out air that optimize the removal of dust.

Due to the fact that the cover is held tightly against the dust collection box in elastic and impermeable fashion, it is particularly easy to open and close. The indentations on the sides of the dust collection box provided for opening purposes make it easier for the operator to establish a hold with his fingers and handle the dust collection box using one hand without the use of tools when removing, emptying, and reattaching the dust collection box.

Due to the fact that sealing lips are arranged in the blow-in connection of the dust collection box that encompass the dust blow-out connections of the manual machine tool and act as a seal, the dust collection box is reliably dust-proof during operation of the manual machine tool.

Due to the fact that the fluted filter is situated only in the cover of the dust collection box, it is particularly easy to replace in that a new one is either attached using adhesive, or the entire cover is replaced along with the filter.

Due to the fact that the dust collection box can be attached to the manual machine tool using locking levers designed in the shape of a rocker, it can be removed, emptied, and reattached in particularly convenient and time-saving fashion.

Due to the fact that the blow-in connection of the dust collection box can be closed using a valve, dust can be effectively prevented from escaping unintentionally when the dust collection box is removed from the manual machine tool.

BRIEF DESCRIPTION OF THE DRAWINGS

The invention is explained in greater detail below using a design example with associated drawings.

DETAILED DESCRIPTION OF THE PREFERRED EMBODIMENTS

Figure 1:
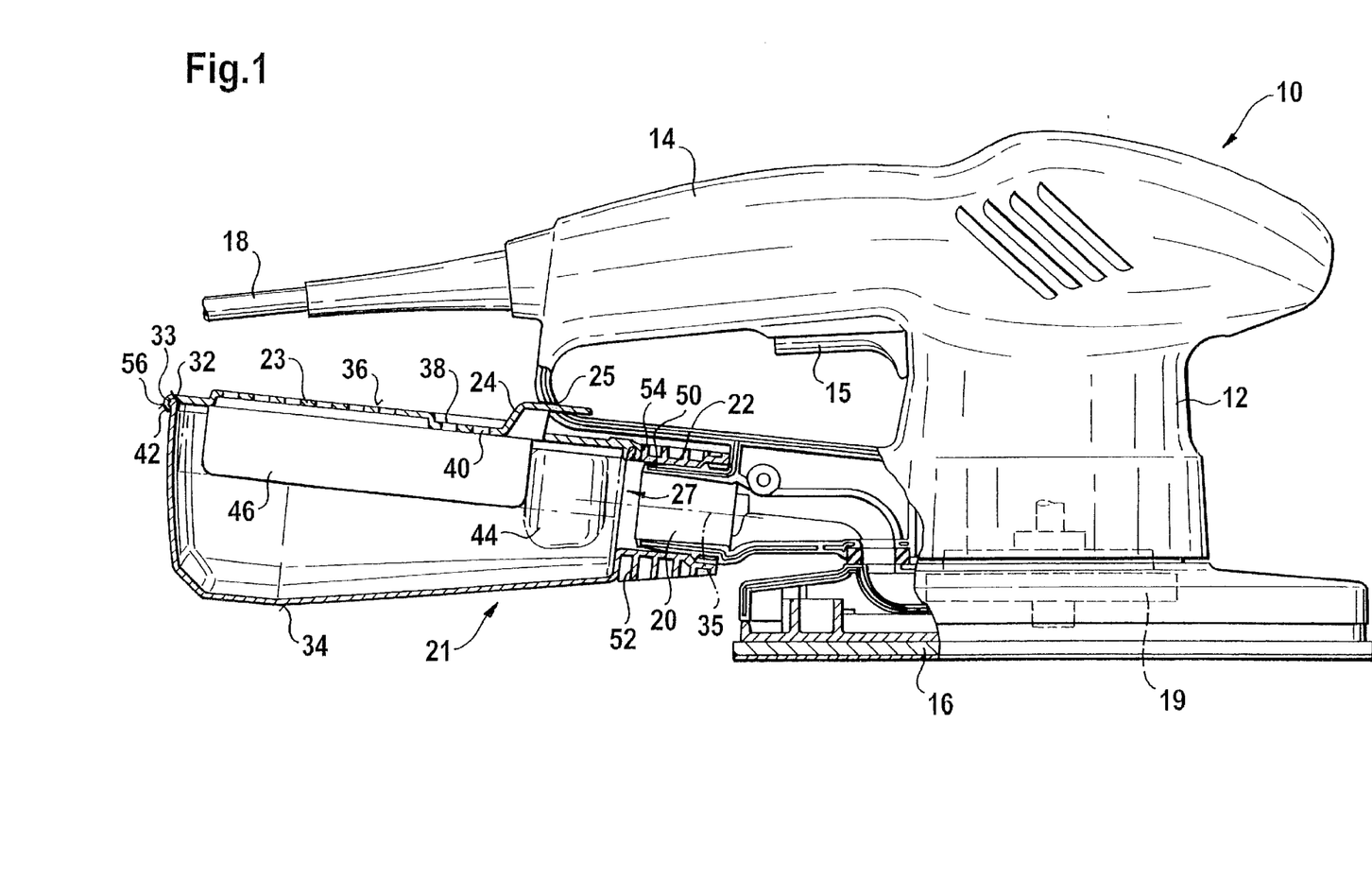
FIG. 1 shows a longitudinal view of a manual machine tool with a dust collection box according to the invention.

The longitudinal view in FIG. 1 showed a manual machine tool 10 designed as an orbital sander with a housing 12 that has a handle 14 with switch 15, to which a tool 16 designed as a rubbing plate is attached in a fashion that allows it to move. The manual machine tool 10 comprises an electric connecting cable 18 on the back end of the handle 14 and a fan wheel 19 inside the housing 12. The fan wheel 19 creates a vacuum over the rubbing plate when the manual machine tool is operated. Grinding dust is thereby removed at and below the rubbing plate 16 and blown through a blow-out connection 20 of the housing 12.

The blow-out connection 20 comprises a blow-in connection 22 form-fit above it that belongs to a dimensionally stable dust collection box 21 arranged in self-contained fashion. Except for the blow-in port 27 of the blow-in connection 22 and its top side, the dust collection box 21 is airtight. The top side of the dust collection box 21 is formed by a cover 23, out of the top side 36 of which a hook 24 extends to grip in a retention opening 25 in the rear section of the handle 14. The dust collection box 21 is also held tightly against the housing 12 of the manual machine tool by way of the hook 24, which allows the housing structure of the dust collection box 21 to be constructed with particularly thin wall cross-sections, making it extremely lightweight.

The cover 23 of the dust collection box 21 is held particularly tightly in spring-elastic, latching fashion at the upper edge 32 of the dust collection box 21—which forms a circumferential bead 33—by way of its snap-in edge 42 in an interlocking, adherence-actuated fashion.

The bottom side 34 of the dust collection box 21 is tilted in comparison to the longitudinal axis of the blow-in connection 22, so that, in the longitudinal view, the dust collection box 21 forms a wedge shape in comparison to the axis 35 and tapers toward the manual machine tool 10.

The top side 36 of the cover 23 comprises spherical air-exit holes 40 with a filter element 48 made of special paper and designed as a fluted filter installed before them, so that its top side 49 (FIG. 9) faces the underside of the cover 23. Additionally, the top side 36 of the cover 23 is provided with an indentation 38 having a u-shaped profile in the area of the hook 24 which is directed toward the interior of the dust collection box 21 that stiffens the structure of the cover 23 and provides space to accommodate the passage of larger, further overhanging housing shapes of other manual machine tools.

Two side indentations 44 are provided on opposite sides of the front section of the dust collection box 21 near the blow-in connection 22 that make it easier for the operator to reach under the cover 23 with his fingers and therefore conveniently open the cover 23.

The cover 23 comprises two side panels 46 that extend as single parts parallel to the side edges 58 of the dust collection box 21 and project into the interior of the dust collection box 21 in keel-like fashion and form a lateral delineation and mechanical protection for the filter element 48 if the cover is removed from the dust collection box 21 and set aside, and if dust is knocked out of the filter element 48.

The blow-in connection 22 of the dust collection box 21 includes a circumferential sealing lip 50 in the interior that encloses the blow-out connection 20 of the manual machine tool in airtight fashion. Moreover, the blow-in connection 22 of the dust collection box 21 comprises ribs on the top and bottom that improve the stiffness of the dust collection box 21 when the wall cross-section is thin.

Figure 2:
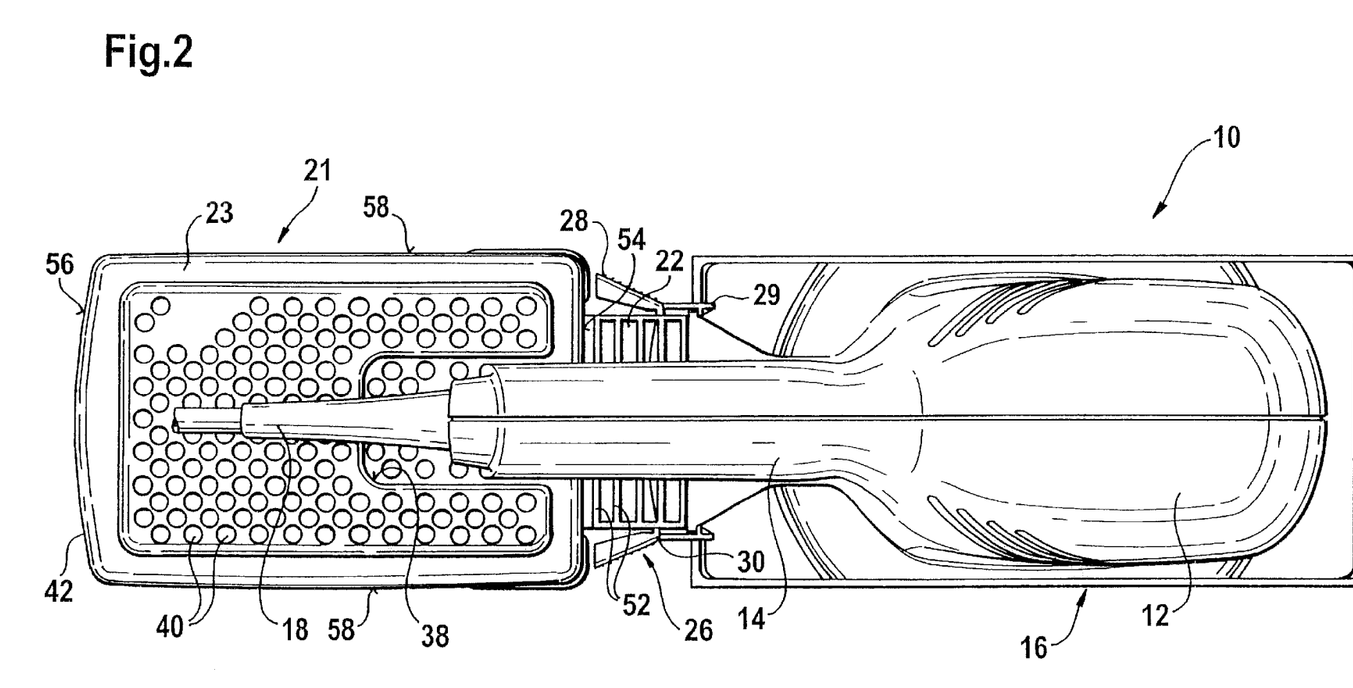
FIG. 2 shows a top view of the manual machine tool according to FIG. 1.

FIG. 2 shows the details of the manual machine tool 10 with the dust collection box 21 mentioned previously, with the following being particularly easier to see than in FIG. 1: the indentation 38 of the cover 23, the holes 40 for blow-out air cleaned of dust to pass to the outside, and a rocker 26 for attachment of the dust collection box 21 to the manual machine tool 10 by way of latching. The rocker 26 of the dust collection box 21 is designed as a dual-arm lever, one of the arms of which is designed as the push-button arm 28 and the other arm of which is designed as the latch arm 29. The rocker 26 is attached to the blow-in connection 22 of the dust collection box in pivoting fashion by means of a film hinge 30. The latch arm 29 is held tightly by a lateral projection—not shown—of the housing 12 of the manual machine tool 10 in the area of its blow-out connection 20 in an elastic, preloaded fashion.

It is also made clear that the base of the manual machine tool 10 is formed by the rectangular rubbing plate 16, and that the back edge 56 of the dust collection box 21 and the cover 23 arches toward the outside.

Figure 3:
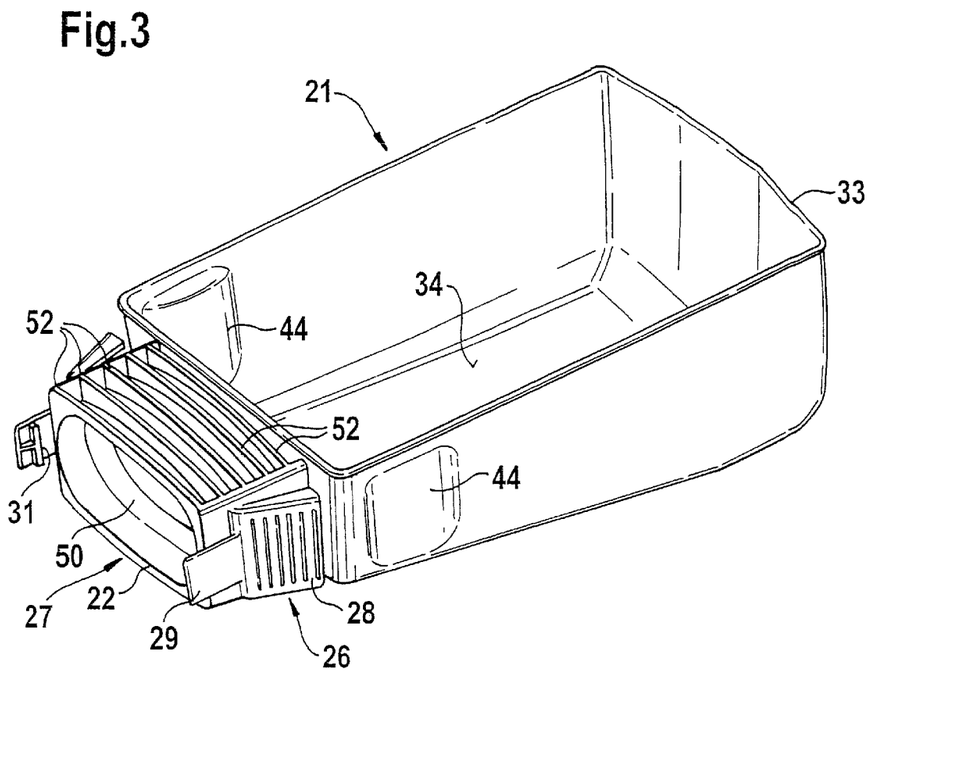
FIG. 3 shows a spacial view of the dust collection box with the cover removed, as viewed diagonally from the front.

The detail of the dust collection box 21 without the cover 23 shown in FIG. 3 shows its details mentioned in the descriptions of FIGS. 1 and 2 once more. Additionally, the bead 23 becomes obvious, which extends around the circumference enclosed by the upper edge 32 and, together with the snap-in edge 42 (FIGS. 1, 7) forms a tighly closing connection between the cover 23 and the dust collection box 21 that is convenient to open. The indentations 44 that make it easier to establish a hold on the side underneath the cover 23 and open it using the fingers are also obvious. FIG. 3 also clearly shows the blow-in connection 22 with the circumferential sealing lip 50, the rockers 26 situated on opposite sides, and their one push-button arm 28 and one latch arm 29 each with internal snap-in edge 31 for latching in a recess of the blow-out connection 20 to hold the dust collection box 21 tightly against the manual machine tool 10 in positive fashion.

Figure 4:
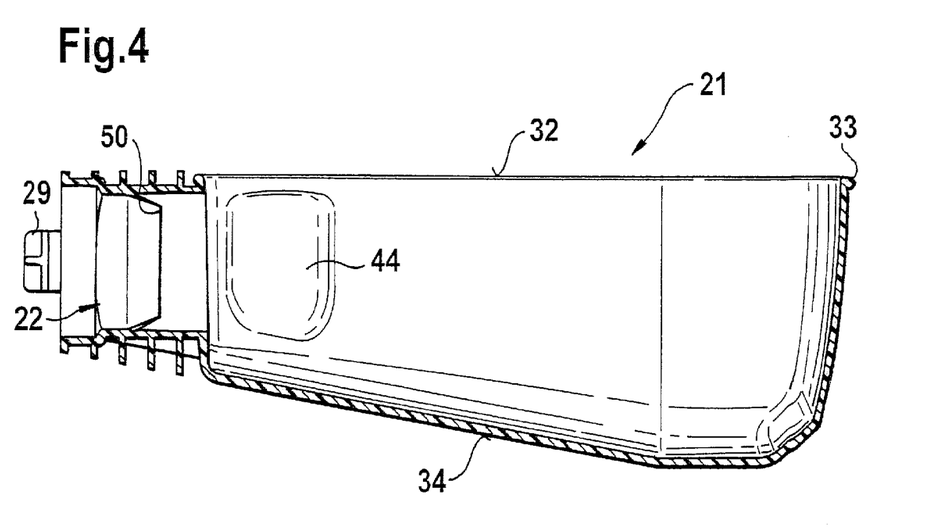
FIG. 4 shows a longitudinal view of the dust collection box with the cover removed.

FIG. 4 shows the longitudinal view of the dust collection box 21 with the circumferential bead 33 on the upper edge 32 of the dust collection box 21, whereby the position of the sealing lip 50 inside the blow-in connection 22 of the dust collection box 21 is particularly obvious.

Figure 5:
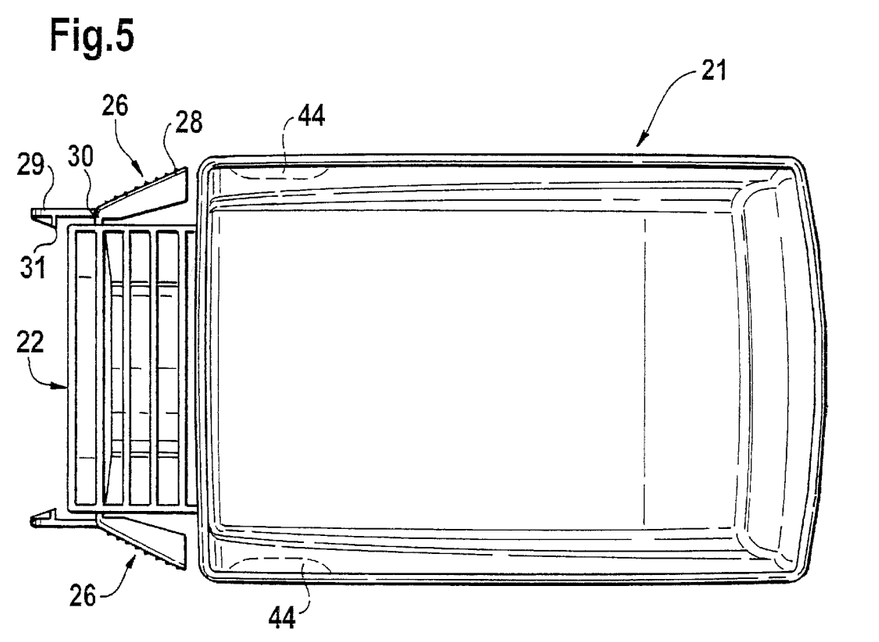
FIG. 5 shows a view of the dust collection box from below.

FIG. 5 shows the top view of the open dust collection box 21 with the upper edge 32, the indentations 44, the dust blow-in connection 22, and the rocker 26. Particularly obvious are the push-button arm 28 of the rocker 26 with nubs—not shown in greater detail—the latch arm 29, and the snap-in edge 21 situated on the inside of the latch arm 29 for latching into a recess—not shown in greater detail—of the manual machine tool 10.

Figure 6:
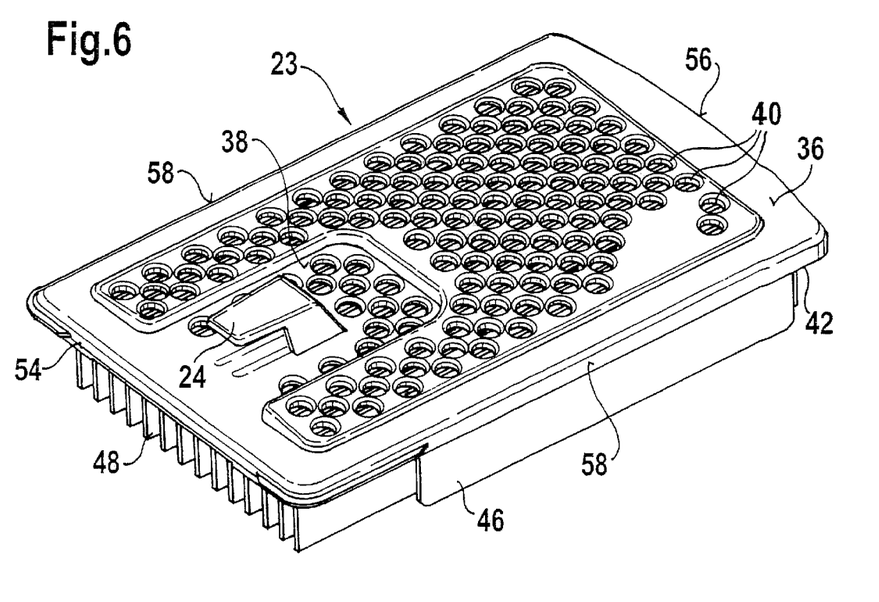
FIG. 6 shows a spacial top view of the dust collection box.

FIG. 6 shows the spacial top view of the cover 23 of the dust collection box 21 with the round air-exit holes 40 that penetrate the cover 23, the arched back edge 56, the straight side edges 58, as well as the straight front edge 54. The hook 24 is also obvious, which projects upward and forward tangent-bent from the indentation 38 impressed in the cover. Moreover, the side panels 46 that form a single part with the cover 23 and project downward in keel-like fashion are obvious. They provide mechanical protection against damage to the fluted filter 48 designed in the shape of ribs and which projects downward.

Figure 7:
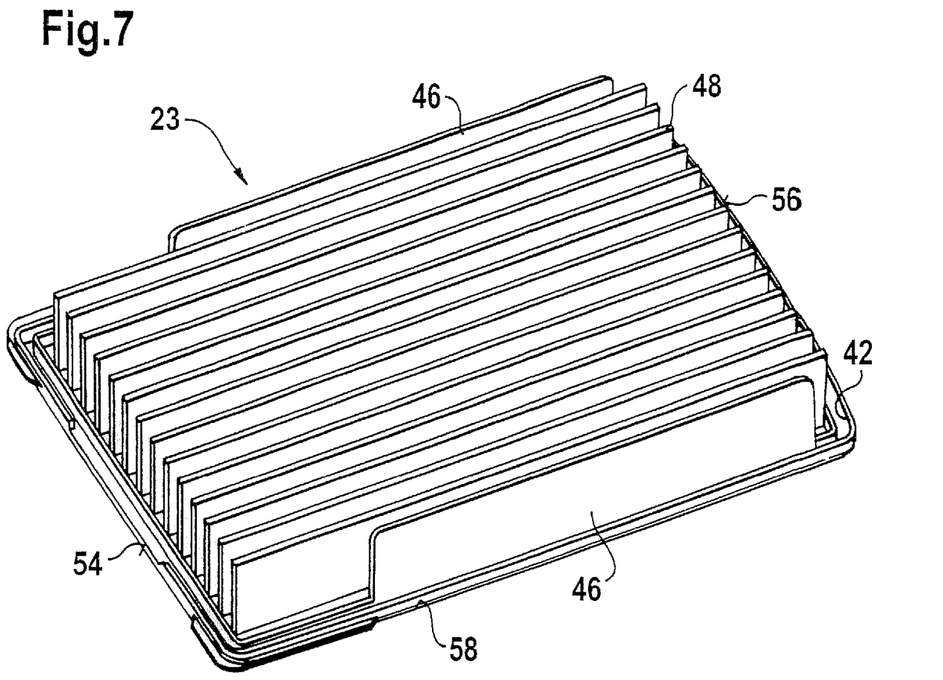
FIG. 7 shows a spacial bottom view of the dust collection box.

FIG. 7 shows a spacial view of the underside of the cover 23, whereby the snap-in edge 42, the keel-like side panels 46, and the filter element 48 provided with rib-like lamina 47 extending in the longitudinal direction of the dust collection box 21 and designed as a fluted filter are obvious. Moreover, the back edge 56 arched toward the outside, the straight front edge 54 and the straight side edges 58 are obvious.

Figure 8:
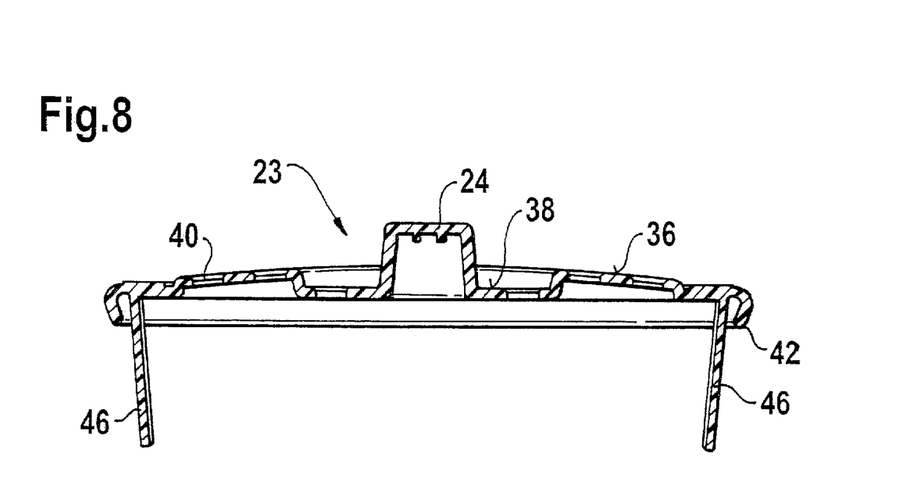
FIG. 8 shows a cross-section of the dust collection box.

The cross-section of the cover 23 shown in FIG. 8 clearly depicts the arrangement of the keel-like side panels 46, the circumferential snap-in edge 42, the indentation 38 with the hook 24 projecting upward, and the slightly-arched upper side 36 that extends upward and outward with the air-exit holes 40.

Figure 9:
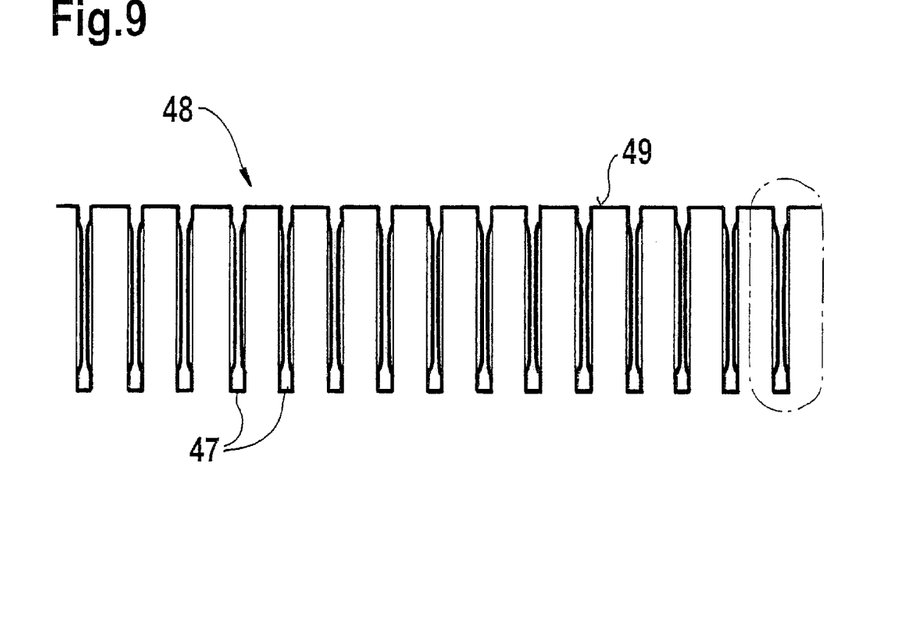
FIG. 9 shows a cross-section of the fluted filter of the dust collection box.

FIG. 9 shows a detained view of the filter element 48 designed as a laminar filter for non-removeable insertion in the cover 23. Its filter lamina 47 extend parallel with the side panels 46 of the cover 23 and in the longitudinal direction of the dust collection box 21 like ribs. It also becomes clear in FIG. 9 that the filter lamina 47 were made to form a flat filter plate with increased surface area using a process of meandering folds and stamped-out sections, and that the filter element 48 is attached via adhesion, in particular, or welded to it with its top side 49 facing the underside of the cover 23.

Figure 10:
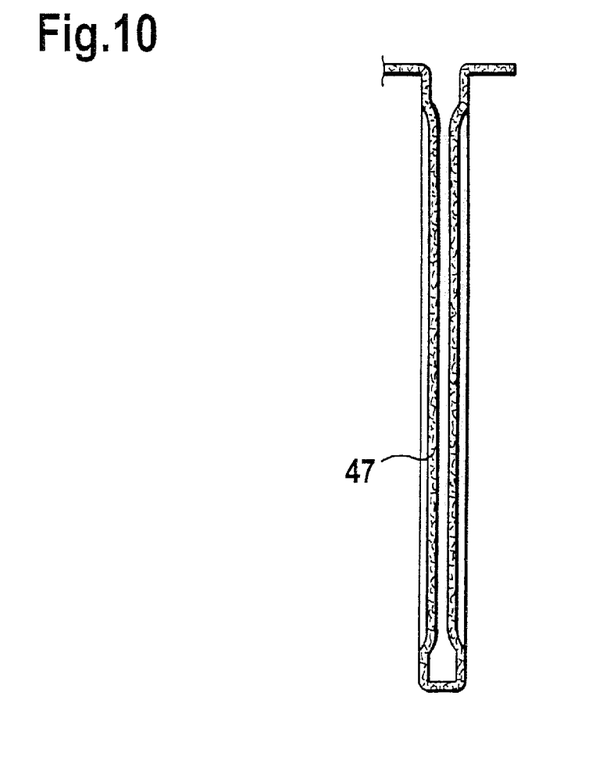
FIG. 10 shows an enlarged cross-section of a single lamina of the fluted filter.

The enlargement of a single filter lamina 47 shown in FIG. 10 reveals its meandering design and stamped out-sections on the sides. As a result of this design, when a certain critical amount of dust is collected, it comes loose from the filter lamina 47 under the influence of gravity, falls downward toward the dust collection box 21, and clears the filter element 48 for optimal passage of air.

Figure 11:
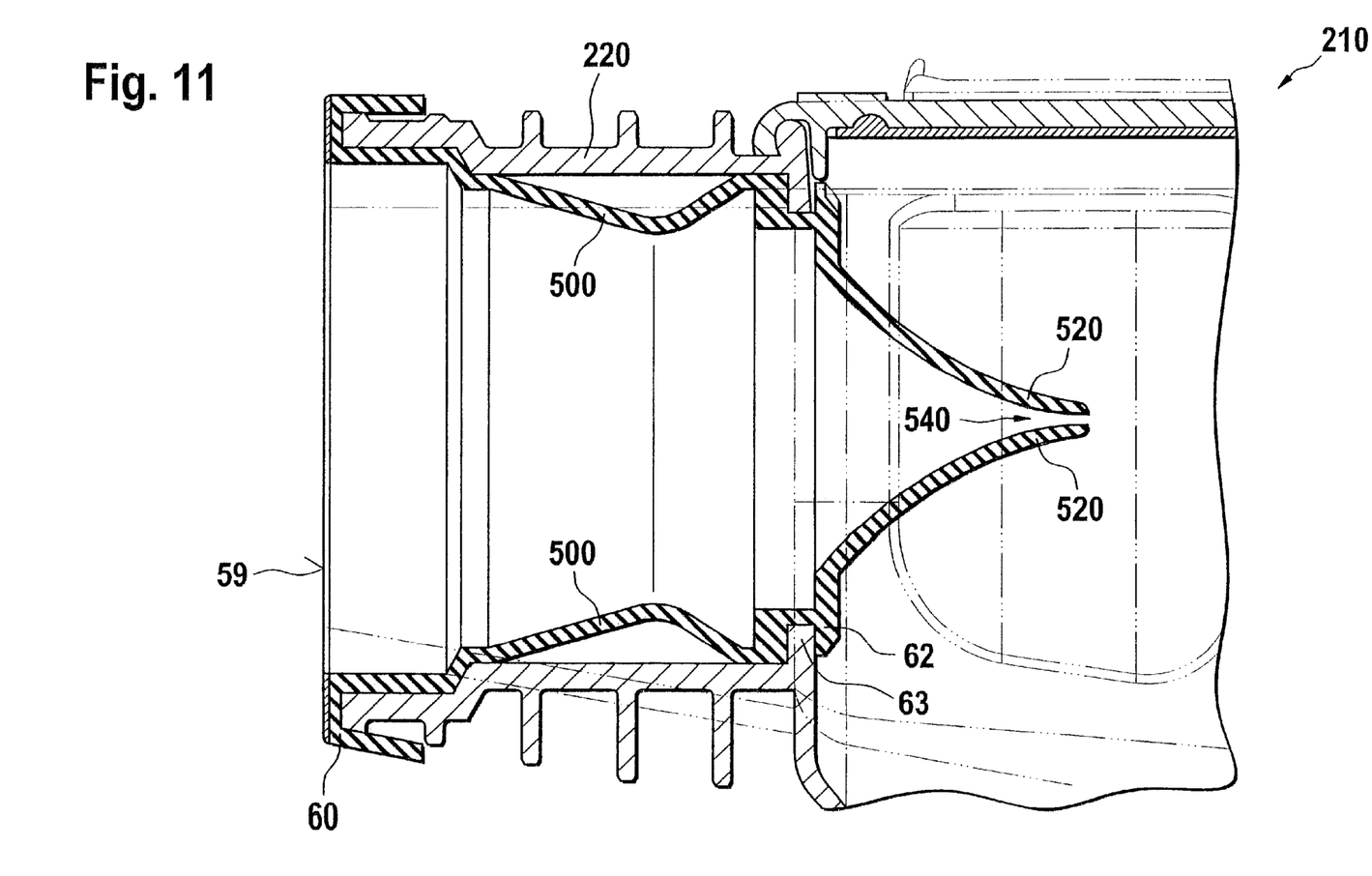
FIG. 11 shows a longitudinal view of a design example of a blow-in connector of the dust collection box with sealing flaps connected to the sealing lips.

FIG. 11 shows a longitudinal view of a section of the dust collection box 210 in the region of the blow-in connection 220. Sealing lips 500 are situated there that encompass the dust blow-out connection 200 of a manual machine tool in sealing fashion and prevent dust from escaping and outside air from entering. The sealing lips 500 arch in convex fashion inward and toward the middle of the aspiration connection and form a type of bead diagonal to the longitudinal axis. The elastic, thin walls of the sealing lips 500 continue toward the interior of the dust collection box and are held tightly there on rib-like projections of the dust collection box. Each of the regions of the sealing lips 500 that extend further toward the inside of the dust collection box is designed as a sealing flap 520. They effectively retain the dust inside the dust collection box 210 after the machine is turned off. The functions of sealing off the blow-in connection 220 and providing protection against the escape of dust are thereby effectively combined.

The sealing and dust-retention element comprises a rubber-elastic material such as an elastomer or NBR (acrylnitryl-butadien-rubber). This formed part is distinguished by its favorable price and can be used in boxes of different sizes.

When the dust collection box is slid onto the dust blow-out connection of associated manual machine tools, the sealing lips 500 are elastically deformed in such a way that the wall in front of it acts as a seal.

To secure its position, the formed part is provided with a circumferential collar 60 on the front of the blow-in connection 59 and a circumferential latch nose 62 on a circumferential rib 63 of the back side of the blow-in connection. Instead of the circumferential collar in the front section, latch noses or pegs can be applied to prevent a drawing-in into the blow-in connections 220. The proper function of the closing flaps 520 is ensured by way of the conical or bent shape of the individual flaps as well as by the selection of a suitable elastic material, so that the sealing slit 540 between the front sides of the flaps 520 is always sealed off securely when an airstream from the machine side does not try to open it.

Figure 12:
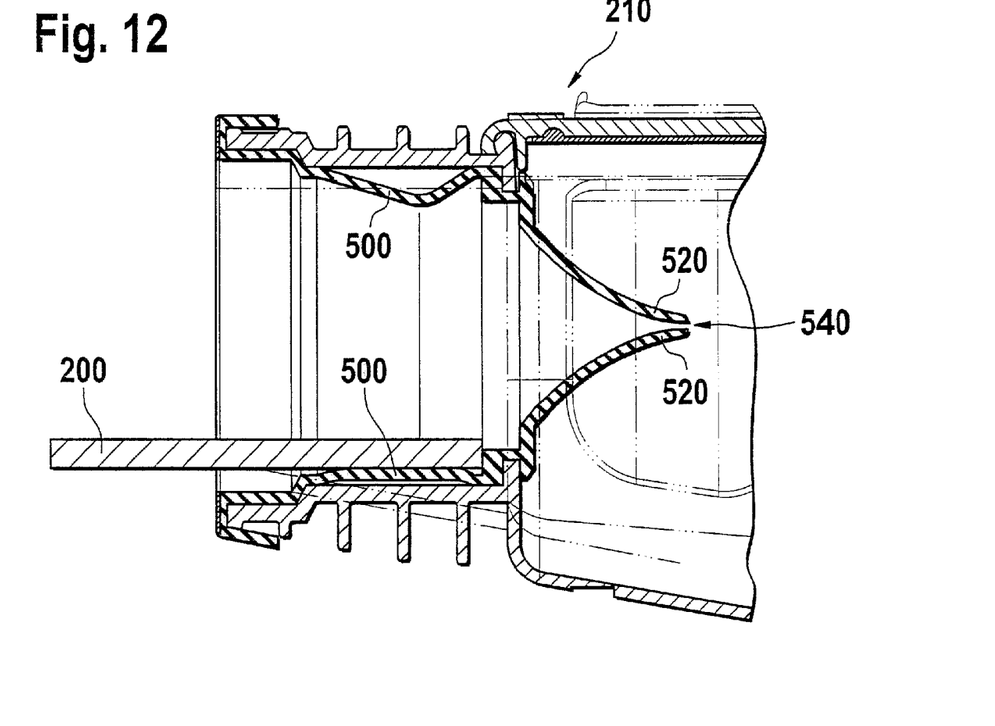
FIG. 12 shows the longitudinal view according to FIG. 11 with a a sealing lip that has been acted upon.

FIG. 12 shows the lower section of the sealing lip 500 when seated on the dust blow-out connection 200 of an associated manual machine tool. The remaining details are the same as described for FIG. 11.

Figure 13:
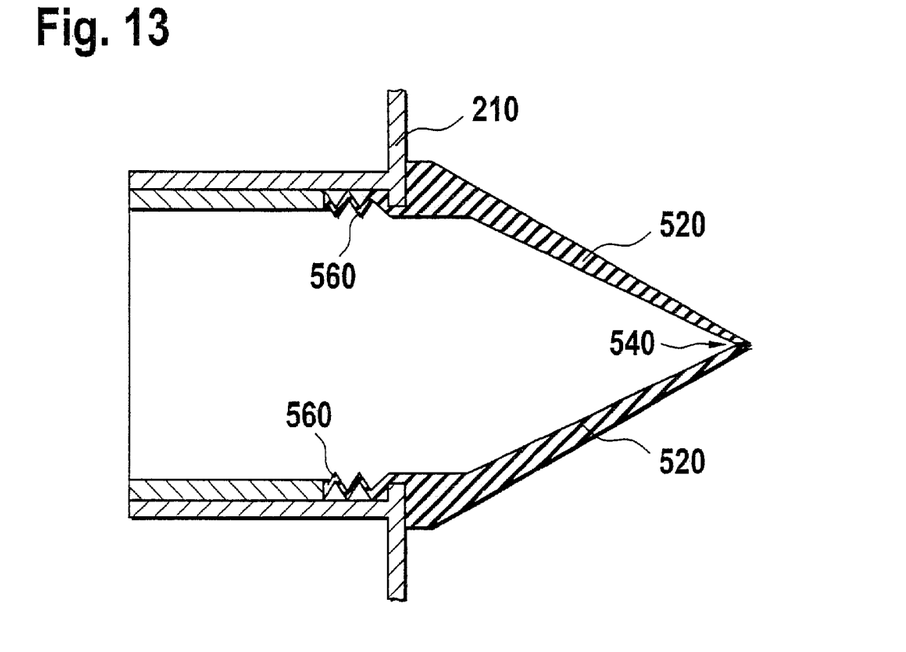
FIG. 13 shows a further embodiment of sealing flaps with short sealing lips.

FIG. 13 shows a variant of sealing lips 560 designed as a bellows.

Figure 14:
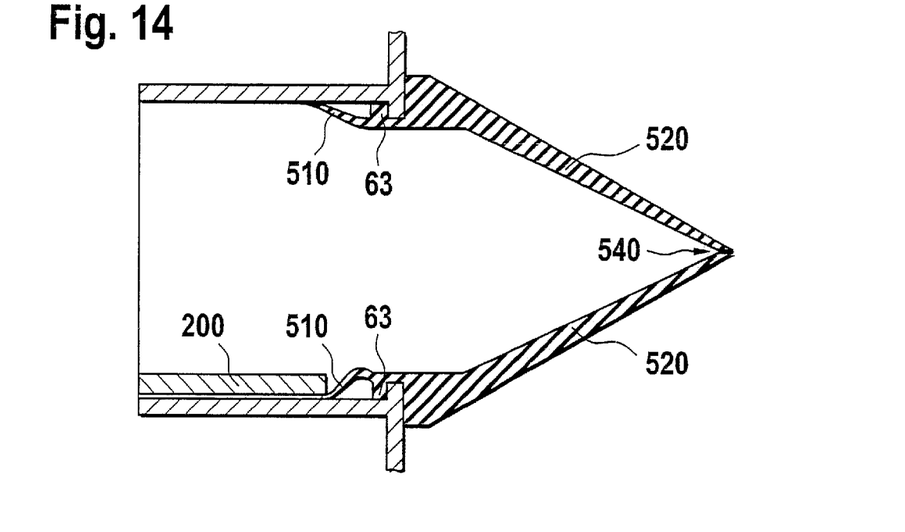
FIGS. 14 and 15 show a final embodiment of sealing flaps with short sealing lips.

In the top part of the drawing, FIG. 14 shows a short sealing lip 510 that is held tightly on a circumferential rib 63 of the back side of the blow-in connection only by way of a latching groove 62. The sealing lips 510 press against the inside of the blow-in connection 220 with prestress, so that, when it is slid onto the dust blowout connection of a manual machine tool, the sealing lip comes between them and a corresponding sealing effect can take place.

Figure 15A:
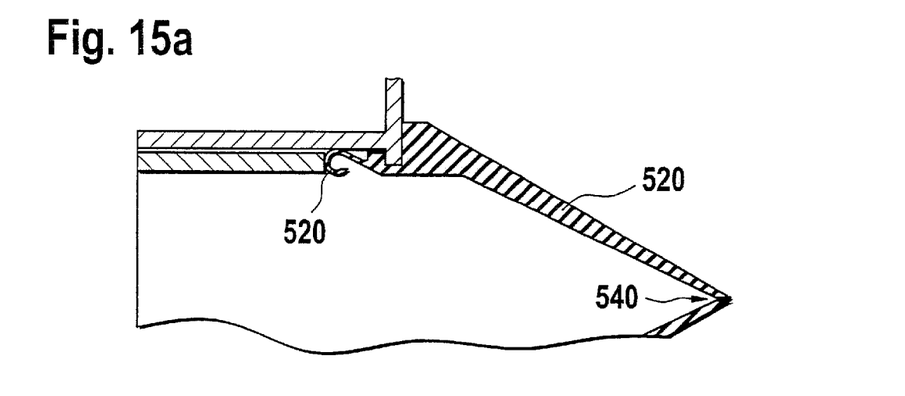
Figure 15B:
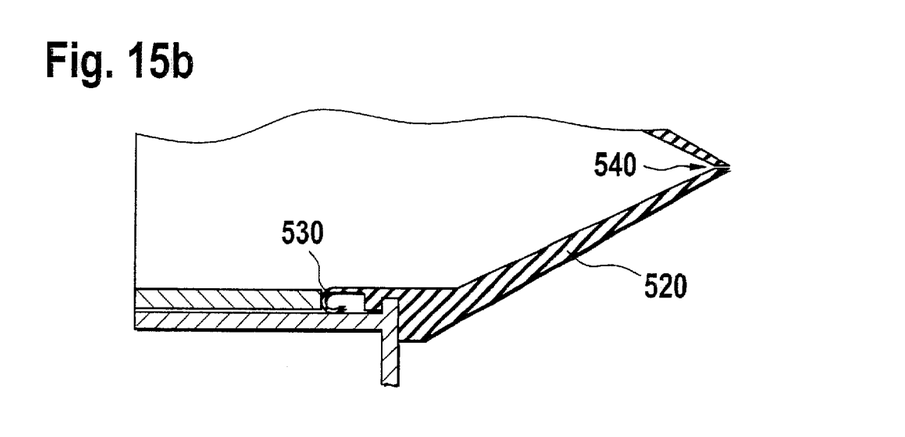

FIG. 15a shows the two sealing lips 520 designed as a bead rolled toward the inside, and, in FIG. 15b, as a bead rolled toward the outside.

What is claimed is:

1. Manual machine tool (10) having a housing (12) enclosing a vacuum device for dust removal (19) and a blow-out connection (20) installed after the vacuum device, to which a dust collection box (21) can be attached in detachable fashion via a blow-in connection (22) of the dust collection box (21), wherein said dust collection box (21) is airtight on all but two sides, such that air can pass on the two sides but dust cannot pass on the two sides, the dust collection box (21) comprising air-exit holes (40) on a top side (36) and comprising a dustproof filter element (48) on the inside, said manual machine tool further comprising a pair of sealing lips (500) arranged as a separate part inside the blow-in connection (22), wherein the pair of sealing lips (500) is connected as a single part with closing flaps (520, 520) projecting into the interior of the dust collection box (210).

* * * * *